United States Patent Office 2,834,726
Patented May 13, 1958

2,834,726

ELECTROLYTICALLY DISSOLVING IRON

Jay Y. Welsh, Brainerd, Minn., assignor to Manganese Chemicals Corporation, Minneapolis, Minn., a corporation of Minnesota No Drawing. Application June 8, 1955
Serial No. 514,118

13 Claims. (Cl. 204—82)

This invention relates to the art of dissolving iron, and is concerned with the dissolution of iron in aqueous ammoniacal ammonium carbamate solution to the production of a solution containing in excess of 45 gm./l. of iron in the form of an ammonio complex thereof.

It heretofore had been known, through U. S. Patents Nos. 2,608,463 to Reginald S. Dean and 2,621,107 to Reginald S. Dean et al., that relatively highly concentrated solutions of manganese, e. g., solutions containing as much as 100 grams per liter of manganese, could be produced by leaching a manganese-containing material, in which the manganese was present either in the form of manganous oxide, MnO, or in the form of metallic manganese, with a strongly ammoniacal aqueous solution of ammonium carbamate, e. g., with an aqueous solution made from 50–300 grams per liter of ammonia ($NH_3$) and 38.5–90.0 grams per liter of carbon dioxide ($CO_2$). Since it was believed that ferrous oxide (FeO) should behave much the same as manganous oxide in respect of ammoniacal ammonium carbamate solution, both dissolving in the carbamate solution—presumably forming the same type of complex—and both being precipitatable, under proper conditions, as the carbonate, it previously had been attempted to reduce the iron oxide content of an iron ore to FeO and to leach the reduced ore with aqueous strongly ammoniacal ammonium carbamate solution. However, it was found that even under optimum conditions no more than 45 gm./l. of iron could be leached from reduced iron ore in a three-day leaching period, whereas solutions containing 90–100 gm./l. of manganese could be produced in a leaching period of about 15 minutes. While metallic manganese readily dissolves, as MnO, in the ammoniacal carbamate liquor with rapid evaporation of hydrogen, metallic iron—other than in very active pyrophoric form—does not go into solution in a similar manner.

It has now been discovered that carbamate solutions containing a high concentration of iron in complex, e. g., a solution containing in excess of 45 gm./l., can be produced by the aid of anodic dissolution of iron metal in the carbamate liquor. In the carrying out of the process of the present invention the potential of the metallic iron is raised, by an external E. M. F. applied by electrolytic action, to a level akin to that of manganese, and the dissolution of iron proceeds with the evolution of hydrogen from the cathode of the electroyltic cell. The general principles of the anodic dissolution of iron in ammonium carbamate solution may be summarized as follows:

The anodic dissolution of iron in ammonium carbamate solution proceeds smoothly provided that the current density is maintained below a critical maximum, which latter is related to the formation of a highly passive oxide film on the iron anode surface resulting in the liberation of oxygen—rather than in the dissolution of iron—and being associated with a rapid rise in operative voltage of the cell above a normal cell voltage of 0.4–0.7 volt for a cell containing an iron anode and an iron cathode, of about equal size, spaced apart about one inch. This limiting or critical maximum current density is related inversely to the concentration of the iron in solution, and varies between 25–30 amperes per square foot for solutions containing a low concentration (0–5.0 gm./l.) of iron and 3–5 amperes per square foot for solutions containing 70–80 gm./l. of iron. Passivation of the anode surface—when the same occurs—can be removed by reversing the direction of current for a brief period, e. g., 30 seconds or less.

It has been found that stainless steel is passive under the above-stated conditions of operation, and hence that it is convenient to employ as the anode a stainless steel basket containing the iron or steel scrap serving as the starting material.

While iron solutions formed by the anodic dissolution of metallic iron in ammoniacal ammonium carbamate solution have, by the process of the present invention, been prepared containing 80 gm./l. of iron, it appears more practicable—in the interest of maintaining relatively high current densities and because of ease of operation—to limit the iron concentration of the solution to 40–70 gm./l.

In the solution resulting from the above described anodic dissolution, the dissolved iron is present in the form of an ammonio complex of iron, which latter may be represented by the formula

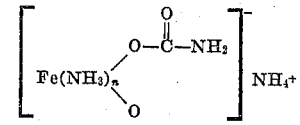

where "$n$" is a whole number greater than 1. The above iron complex is stable at higher temperatures, and/or at lower ammonia concentration, than is the corresponding manganese complex referred to supra: in the light of these considerations it is believed that either the number ("$n$") of $NH_3$ groups is less or else that they are more closely bound to the iron atom.

The above-mentioned ammonio complex of iron can be broken, and ferrous carbonate, $FeCO_3$, can be precipitated from the above described solution, by sufficiently lowering the ammonia concentration of the latter, e. g., by lowering the ammonia concentration to 8 mols/l. or less. Preferably, the complex-containing solution is heated to about 85° C. for some minutes to effect the disengagement of ammonia and the precipitation of the carbonate. When precipitated out of access to air the carbonate is whitish, but upon drying by heating in air the carbonate largely decomposes and a very finely divided, active form of hydrated ferric oxide is produced. The resulting hydrated ferric oxide product is very pure, and the particles are singularly uniform as to size, about 3 to 4 microns in diameter. It (said product) has been found to handle well as a pigment and to have utility in the latter relation. Alternatively, the precipitated product is useful as an intermediate for the production of other iron compounds of great purity.

The process of the present invention provides a practicable means of reclaiming mild steel and cast iron scrap, and makes it possible to produce, from such relatively impure ferrous metal products, high purity iron compounds, e. g., the above-mentioned active form of $Fe_2O_3$, very low in carbon and in silica or other impurity insoluble in the ammoniacal ammonium carbamate liquor.

The invention will now be described in greater particularity and with reference to the following specific examples:

Example 1

An iron pipe constituted the cathode of the electrolytic cell, and the anode was a cylindrical stainless steel wire basket containing sufficient mild steel scrap to give an anode area of approximately 0.5 sq. ft. and of such size as to be spaced about 1 inch from the cathode. The electrolyte was an aqueous ammonium carbamate solution containing about 17 moles/l. of ammonia and about 3 moles/l. of carbon dioxide, and amounted to approximately 1.5 liters. The apparent cathode area was approximately 0.5 square foot. In each of three runs, direct unidirectional current was passed from the anode to the cathode at about 0.5 volt. The final current densities and final concentrations of iron, in gm./l., were as follows:

| Run No. | Final Current Density, amperes per sq./ft. | Final Concentration, Fe, gm./l. |
|---|---|---|
| 1 | 4 | 61.4 |
| 2 | 5 | 41.7 |
| 3 | 5 | 67.0 |

The resulting pregnant, iron-containing, solution obtained in run 3 was transferred to a still and was heated therein for about 30 minutes at approximately 85° C. A whitish precipitate, which separated from the liquid phase, was filtered, and then heated in air at 110° C. for approximately 8 hours, during which heating period its color changed to red. The final dried product amounted to 40 gms. Upon analysis, the so-heated product was found to have the following analysis by weight:

|   | Percent |
|---|---|
| Fe | 58.7 |
| $CO_2$ | .1 |
| Insoluble in HCl | .004 |

This final product was a finely divided hydrated ferric oxide, the particles of which all were fine enough to pass through a 325 mesh screen. It had useful pigmentary properties.

It has been found that the temperature maintained during the anodic dissolution has a strong effect on the critical current density. In spite of the fact that loss of ammonia is accelerated by a rise in temperature, it is desirable if not necessary to maintain the electrolyte (or solution) at a temperature of the order of 85–90° C. in order to maintain a desirable current density; at lower temperatures, the limiting current density drops to a low value.

Example 2

The above experiments were duplicated in a somewhat larger electrolytic cell using as an anode a cylindrical iron pipe and, as cathode, two iron pipes arranged concentrically inside and outside the anode pipe at a spacing of one inch respectively. The apparent anode area was 1.8 square feet. Three runs were made, the final current densities and final iron concentrations being observed:

| Run No. | Final Current Density, Amperes per sq. ft. | Final Concentration, Fe, gm./l. |
|---|---|---|
| 1 | 3.0 | 80.1 |
| 2 | 3.3 | 78.3 |
| 3 | 4.4 | 70.0 |

The resulting iron-containing solutions were further processed similarly to that of run 3 of Example 1 above, and the resulting hydrated ferric oxide product was found to have essentially the same purity and particle size.

It has been found, further, that a precipitate may be obtained from the pregnant solution of Example 1 or Example 2, above merely by bubbling air therethrough. In this case, the precipitate consists essentially of red $Fe(OH)_3$. This is illustrated in the following example:

Example 3

Through 1 liter of pregnant solution identical with that of run No. 3 of Example 1 above, air at substantially room temperature (21° C.) was bubbled for some hours, or until no further precipitation was discernible. The resulting precipitate of red ferric hydroxide was filtered, washed, and dried at 110° C. The dried product analyzed:

|   | Percent |
|---|---|
| Fe | 55.9 |
| Insoluble in HCl | 0.004 |

I claim:

1. Process of producing an aqueous solution of an ammonio complex of iron which comprises anodically dissolving iron metal in an electrolyte consisting essentially of a strongly ammoniacal aqueous solution of ammonium carbamate by passing unidirectional direct current therethrough from a ferrous metal anode to a cathode and continuing the passage of direct current until a predetermined dissolved iron concentration has been attained.

2. Process of dissolving iron in an ammoniacal aqueous solution of ammonium carbamate which comprises making said solution the electrolyte of an electrolytic cell having a cathode and a ferrous metal anode, passing unidirectional direct current from said anode to said cathode, maintaining a current density sufficiently low to avoid the formation of a passive oxide film on the anode surface and continuing the passage of direct current until a predetermined dissolved iron concentration has been attained.

3. The process defined in claim 2, wherein the maximum current density is related inversely to the concentration of the iron in solution and varies between 30 and 3 amperes per square foot.

4. The process defined in claim 2, wherein anodic dissolution of iron is effected at a temperature of from about 85 to 90° C.

5. The process defined in claim 2, wherein the current potential is about 0.5 volt.

6. The process defined in claim 2, wherein the anode comprises an impure ferrous metal selected from the group consisting of scrap iron and mild steel scrap contained within an insoluble foraminous container.

7. The process defined in claim 2, wherein the electrolyte is an ammoniacal aqueous ammonium carbamate solution containing about 17 moles per liter of ammonia and about 3 moles per liter of carbon dioxide.

8. As a new product, a solution of an ammonio complex of iron in an ammoniacal aqueous solution of ammonium carbamate, said solution containing in excess of 45 grams per liter of iron.

9. Process which comprises anodically dissolving iron metal in an electrolyte consisting essentially of a strongly ammoniacal solution of ammonium carbamate by passing unidirectional direct current therethrough from a ferrous metal anode to a cathode and continuing the passage of direct current until a predetermined dissolved iron concentration has been attained, separating the resulting solution from insoluble residue, and precipitating an iron compound of high purity from said solution.

10. The process defined in claim 9, in which precipitation of a carbonate of iron from said resulting solution is effected by removing at least a part of the ammonia content from said solution.

11. The process defined in claim 8, in which precipitation of a carbonate of iron from said resulting solution is effected by heating the latter at an elevated temperature below the boiling point of water.

12. The process defined in claim 9, in which precipitation of ferric hydroxide is effected by bubbling air through said resulting solution.

13. The process defined in claim 9, in which the precipitated iron compound is separated from liquid phase and is dried in air.

References Cited in the file of this patent

UNITED STATES PATENTS

| | | |
|---|---|---|
| 1,129,306 | Marsh | Feb. 23, 1915 |
| 2,184,883 | Muskat et al. | Dec. 26, 1939 |
| 2,715,564 | Arnold | Aug. 16, 1955 |
| 2,737,486 | Bodamer | Mar. 6, 1956 |

UNITED STATES PATENT OFFICE

CERTIFICATE OF CORRECTION

Patent No. 2,834,726                                                  May 13, 1958

Jay Y. Welsh

It is hereby certified that error appears in the printed specification of the above numbered patent requiring correction and that the said Letters Patent should read as corrected below.

Column 3, line 50, Example 1, for "at a temperature of the order of 85-90° C." read -- at a temperature of the order of 85-90° F. --; column 4, lines 45 and 46, for "at a temperature of from about 85 to 90° C." read -- at a temperature of from about 85 to 90° F. --.

Signed and sealed this 9th day of September 1958.

(SEAL)
Attest:

KARL H. AXLINE                                            ROBERT C. WATSON

Attesting Officer                                          Commissioner of Patents